United States Patent
Ivchenko

(10) Patent No.: US 9,779,171 B2
(45) Date of Patent: Oct. 3, 2017

(54) FACETING SEARCH RESULTS

(71) Applicant: LinkedIn Corporation, Mountain View, CA (US)

(72) Inventor: Dmytro Andriyovich Ivchenko, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 438 days.

(21) Appl. No.: 14/495,351

(22) Filed: Sep. 24, 2014

(65) Prior Publication Data

US 2016/0063120 A1 Mar. 3, 2016

Related U.S. Application Data

(60) Provisional application No. 62/043,661, filed on Aug. 29, 2014.

(51) Int. Cl.
*G06F 17/30* (2006.01)

(52) U.S. Cl.
CPC .... *G06F 17/30867* (2013.01); *G06F 17/3064* (2013.01)

(58) Field of Classification Search
CPC .............. G06F 17/30867; G06F 17/3064
See application file for complete search history.

(56) References Cited

U.S. PATENT DOCUMENTS

| | | |
|---|---|---|
| 2008/0243778 A1 | 10/2008 | Behnen et al. |
| 2009/0198675 A1* | 8/2009 | Mihalik ............ G06F 17/30864 |
| 2012/0072432 A1 | 3/2012 | Crosa et al. |
| 2012/0185473 A1* | 7/2012 | Ponting ............ G06F 17/30861 |
| | | 707/728 |
| 2012/0323967 A1* | 12/2012 | Ju ...................... G06F 17/30011 |
| | | 707/780 |
| 2013/0024440 A1 | 1/2013 | Dimassimo et al. |

(Continued)

FOREIGN PATENT DOCUMENTS

WO    WO-2016032570 A1    3/2016

OTHER PUBLICATIONS

Indeed Faceted Navigation, Apr. 16, 2008, http://konigi.com/interface/indeed-faceted-navigation/.*

(Continued)

*Primary Examiner* — Augustine K Obisesan
*Assistant Examiner* — Lahcen Ennaji
(74) *Attorney, Agent, or Firm* — Schwegman Lundberg & Woessner, P.A.

(57) ABSTRACT

A business networking system receives a user a first search query that includes search criteria. The system executes the first search query to retrieve information relating to members of the business networking system based on the search criteria and to retrieve additional information relating to one or more facet values of the business networking system based on the search criteria and a scoring of a relevance of the facet values to the user. The system then executes a second search query using the one or more retrieved facet values to determine a count of documents that satisfy the search criteria and that include the one or more facet values. The system selects a portion of the facet values for transmission to the user, and displays on a user device the information relating to the members, the one or more facet values, and the counts for the one or more facet values.

15 Claims, 6 Drawing Sheets

(56) References Cited

U.S. PATENT DOCUMENTS

| | | | |
|---|---|---|---|
| 2013/0166547 A1* | 6/2013 | Pasumarthi | G06Q 10/06 707/728 |
| 2014/0095253 A1 | 4/2014 | Demele et al. | |
| 2014/0278967 A1* | 9/2014 | Pal | G06Q 30/0254 705/14.52 |
| 2015/0227624 A1* | 8/2015 | Busch | G06F 17/30982 707/728 |
| 2015/0254303 A1* | 9/2015 | Saadat | G06F 17/30321 707/716 |

OTHER PUBLICATIONS

"International Application Serial No. PCT/US2015/021827, International Search Report mailed May 29, 2015", 4 pgs.
"International Application Serial No. PCT/US2015/021827, Written Opinion mailed May 29, 2015", 6 pgs.
"International Application Serial No. PCT/US2015/021827, International Preliminary Report on Patentability mailed Mar. 9, 2017", 8 pgs.

\* cited by examiner

HOME   PROFILE   CONNECTIONS   JOBS   INTERESTS

SEARCH   110         1,225,772 RESULTS FOR "JAVA MOUNTAIN VIEW"   130

| LOCATION △ | |
|---|---|
| ☐ ALL | 112 |
| ☐ UNITED STATES | (425417) |
| ☐ INDIA | (284008) |
| ☐ SAN FRANCISCO BAY... | (80054) |
| ☐ BENGALURU AREA, INDIA | (70258) |
| ☐ UNITED KINGDOM | (48123) |
| + ADD | |

| CURRENT COMPANY △ | |
|---|---|
| ☐ ALL | 122 |
| ☐ IBM | (25417) |
| ☐ TATA CONSULTANCY S... | (24008) |
| ☐ INFOSYS | (18054) |
| ☐ ORACLE | (14258) |
| ☐ ACCENTURE | (11123) |
| + ADD | |

120

 CHERYL WILSON
SOFTWARE ENGINEER AT COMPANY ABC
MINNEAPOLIS-ST PAUL AREA- MEDICAL

CURRENT:   JAVA WEB DEVELOPER AT COMPANY XYZ
130

 WILSON CHERYLS
SOFTWARE ENGINEER SPECIALIST COMPANY LMNOP
MINNEAPOLIS-ST PAUL AREA- MEDICAL

CURRENT:   SENIOR SOFTWARE ENGINEER AT COMPANY QRS
130

 DAVID ALEXIK
PATENT ATTORNEY AT FIRM DEF
MINNEAPOLIS-ST PAUL AREA- MEDICAL

CURRENT:   ASSOCIATE AT SLW
130

 ALEXIS DAVIDSON
AUTOMATION ENGINEER AT COMPANY TUV
MINNEAPOLIS-ST PAUL AREA- MEDICAL

CURRENT:   TECHNICAL LEAD AT COMPANY PDQ

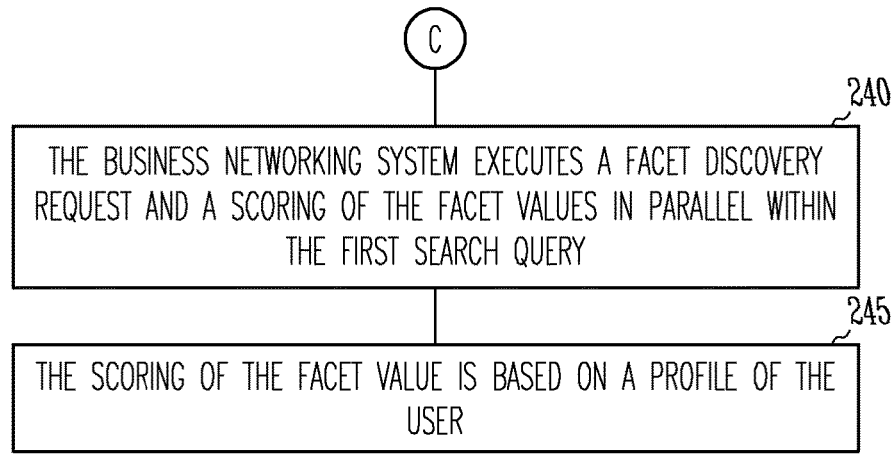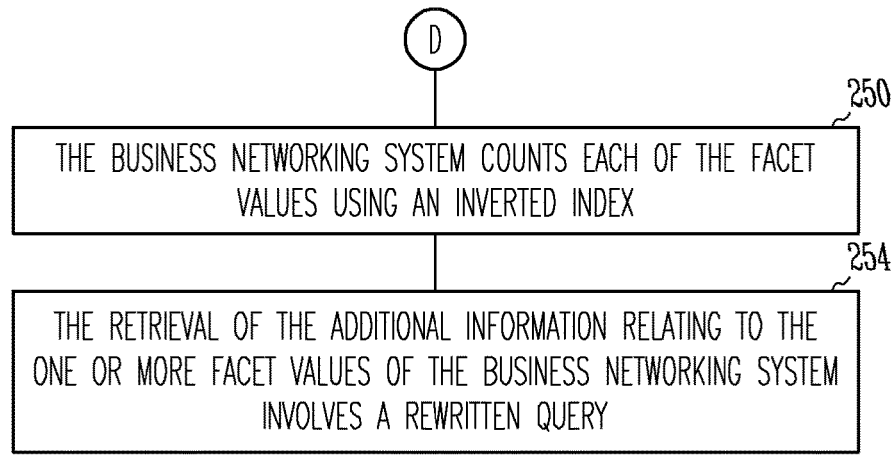
Fig. 2C

FACETING SEARCH RESULTS

RELATED APPLICATIONS

This application relates to U.S. Provisional Patent Application No. 62/031,767, entitled Flexible Operators For Search Queries, filed on Jul. 31, 2014, the contents of which are incorporated herein by reference for all purposes.

TECHNICAL FIELD

The subject matter disclosed herein generally relates to a computer system, and in an embodiment, a social networking system that includes the faceting of search results.

BACKGROUND

A social and/or business networking system maintains data about hundreds of thousands, and more likely than not, millions of people. These data can include a profile of each member of the social networking system. These profiles can include information relating to a person's educational history, employment history, skills set, and other pertinent information about the person. Such a social networking system normally provides to its users the ability to conduct searches on the system. These searches can be for a particular person in the system using the person's name, and/or can include searches for persons that satisfy particular search criteria (such as people who have experience in a certain job skill). These searches can return information on members whose profiles satisfy one or more criteria of the searches, and can further return additional information or facet data relating to the search criteria.

BRIEF DESCRIPTION OF THE DRAWINGS

Some embodiments are illustrated by way of example and not limitation in the figures of the accompanying drawings.

FIG. 1 is an example user interface reporting facet values and facet counts on a social networking system.

FIGS. 2A, 2B, 2C, and 2D are a block diagram illustrating operations and features of a system and method for faceting search results.

DETAILED DESCRIPTION

Figure 2A:
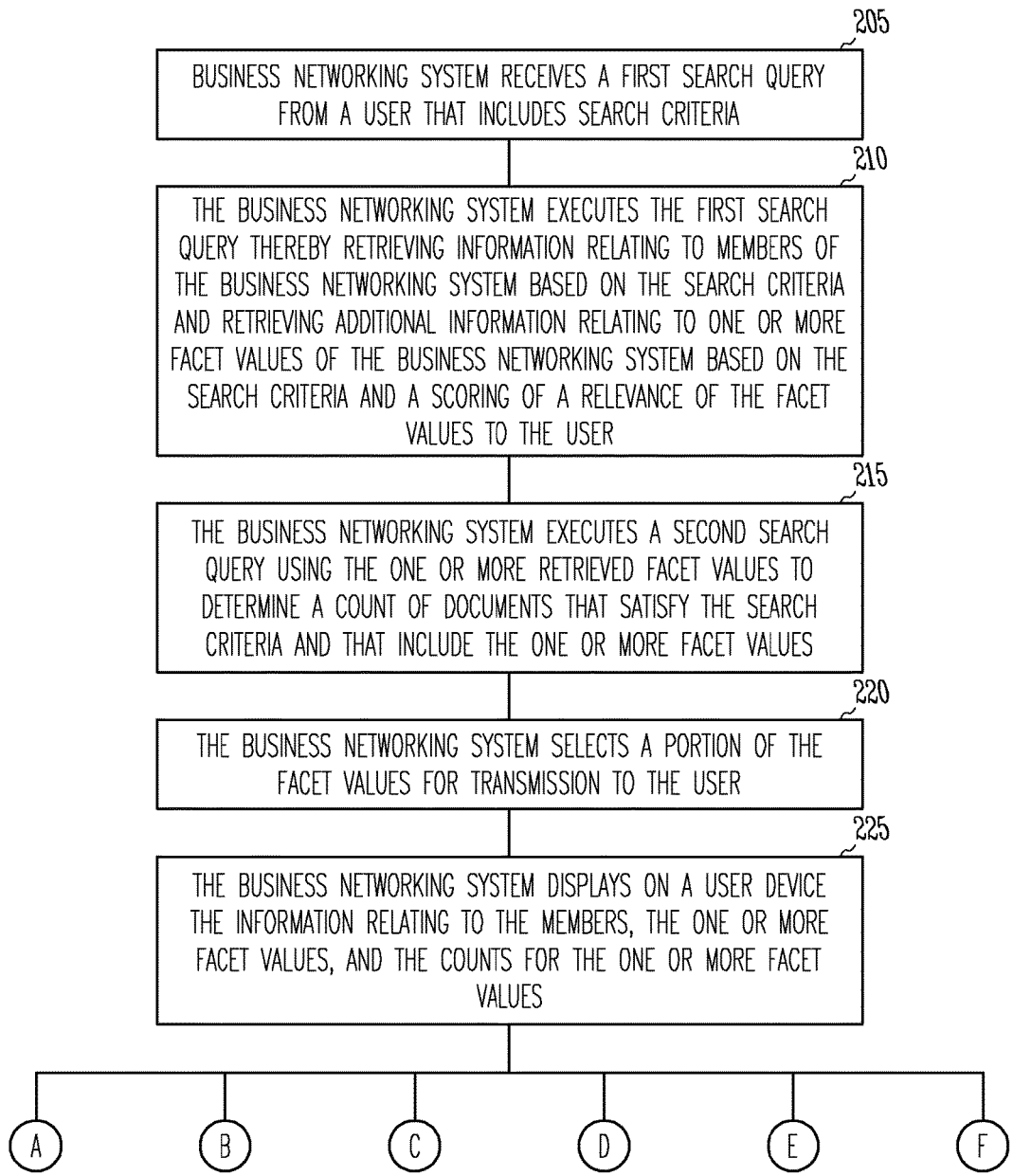
Figure 2B:
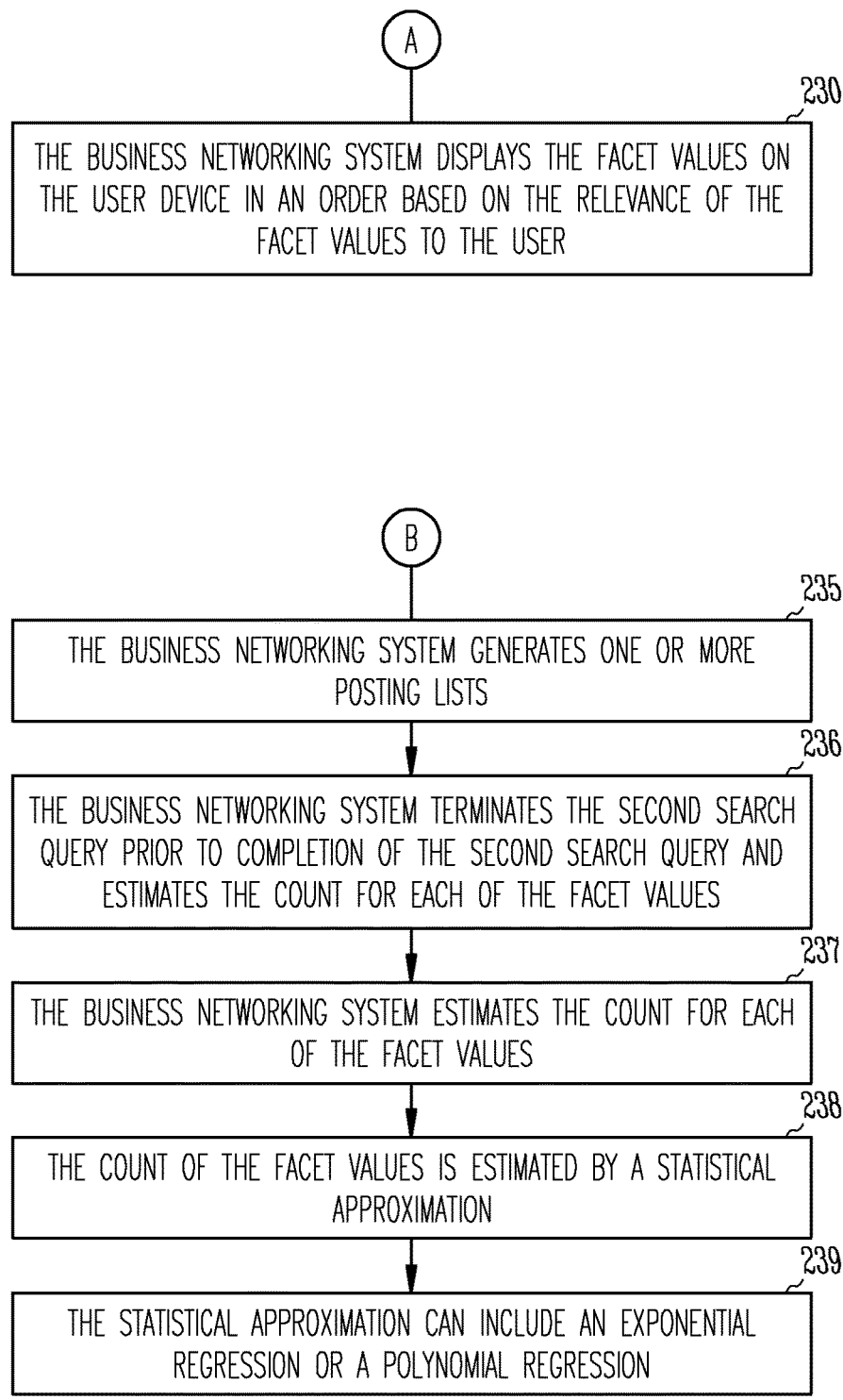
Figure 2D:
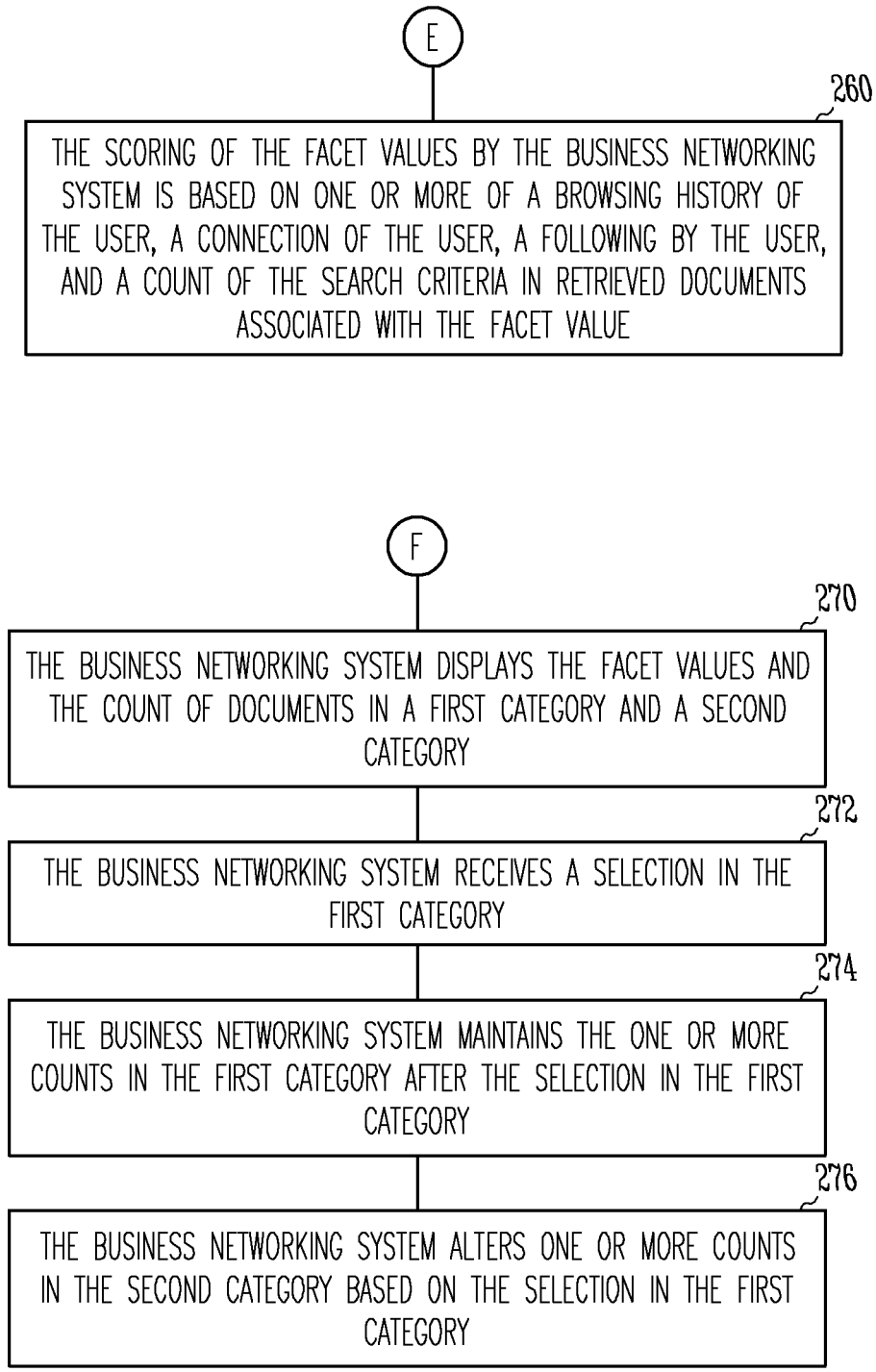

Example methods and systems are directed to a search engine in a social and/or business networking service that returns facet values and facet counts relating to the provided search criteria. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Faceting can be an important feature in a search of a social and/or business networking system. Simply put, faceting provides important auxiliary information about search results. For example, as illustrated in FIG. 1, by running a query "java mountain view," a user can be presented with facets that report locations (countries) 110 and companies 120 with the highest number of java developers 130. In the example of FIG. 1, "Current Company" is called a facet, while "IBM", "Oracle", etc. are referred to as facet values. The numbers 112, 122 adjacent to the facet values denote the number of documents in the system that has the corresponding facet value. Specifically, in the example of FIG. 1, the number of people who work at a given company who match the search criteria (in this example, "java mountain view") are referred to as facet counts. The process of determining the facet counts can be referred to as facet counting. A user can select a facet value so that a filtering of search results will occur. Although facets can have an arbitrary number of hierarchical levels, in an embodiment, two levels normally suffice (that is, the facet name and the facet value).

In an embodiment, faceting supports early termination of a search (for example, because the search is identifying too many hits, taking up too much computing resources, and/or taking too long). Therefore, an embodiment supports approximate facet counting. Some facets can have a very high cardinality. For example, the facet "Years of Experience" for a query involving the search term "engineer" can generate millions of hits depending on the database. In an embodiment, when determining counts of facets values, the counting of the facet values does not affect the values within the same facet. However, it affects the counting of values in other facets. For example, if a first facet relates to countries, and a second facet relates to companies, then selecting a particular country in the country facet will not affect the facet counts in the country facet, but it will affect the facet counts in the company facet. Therefore, an embodiment includes the ability to turn on and off facet counting, while selection criteria remains enabled.

In an embodiment, facets are classified by how their values are discovered and counted. For facet value discovery, there can be facets with discoverable values, facets with configured values, and facets with supplied values. For facets with discoverable values, the values of these facets are discovered at runtime. These typically are facets with a large number of values. For example, for an "Industry" facet, there are hundreds of industries, which have to be discovered and counted for a given query. For facets with configured values, values of these facets are specified in a configuration file. These typically are facets with a small number of values. For example, for a facet of "Profile Language," only a handful of languages are distinguished. For facets with supplied values, values of these facets are supplied during a request. It can be executed when there is a need to count a subset of facet values, which comes from external sources. For example, for a facet of "My Groups," within the social network, only groups for a current user are displayed as compared to a facet of "Groups," which shows all groups within the social networking service.

For facet value counting, there is custom counting and facet value ordering. For custom counting, these types of facets define a custom faceter, which allows one to create a counting query. The custom faceter is called for each facet value. The custom faceter can be defined for any other type of facet, that is, either it is discoverable or it has configured or supplied values. Typically values of custom facets are specified in the configuration file. For facet value ordering, facet values are ordered by counts descending by default. For facets with configured or supplied values, it is possible to preserve the order of values. For example, for a facet of "Profile Languages," the facets are going to be ordered the same way they appear in a search request, regardless of counts. When ordering by counts, facets with zero values may not be returned. When order is preserved, all facet values are returned, including those with zero counts.

In an embodiment, for both facet value discovery and facet value counting, a search query with a weighted OR (WOR) is used. The WOR allows the placement of weights on each clause in a search query and the application of a threshold against the whole query. The query returns a match if and only if the sum of weights of matched clauses is greater than or equal to the threshold. For example, a query such as "WOR n1:ibm %1 type:C %1 type:P %1 [2]" returns a match when at least two out of the three terms (i.e., ibm, C, and/or P) are matched. More specifically, for facet value discovery, when there is facet value selection (e.g., as explained above selecting a facet within country location to determine its effect on the facet counts of the current companies), the WOR query discovers facet values (for K facets with N1, . . . , NK facet value selections each) as follows - - - +rewritten_query+(WOR (?facet_value_selection_1 . . . ?facet_value_selection_N1) %1 . . . ?(facet_value_selection_1 . . . facet_value_selection_NK) %1 [K−1]). Note, that the threshold for a WOR is set to the number of facets−1 (K−1), which means that only one facet can be mismatched at a time. A facet counting query can be constructed in a similar manner, such as the following - - - +query_condition+(WOR (?facet_value_selection_ 1 . . . ?facet_value_selection_N1) % 1 . . . ?(facet_value_selection_1 . . . facet_value_selection_NK) %1 [K−1]) ?(?not_selected_facet_value1 . . . not_selected_facet_valueM). As noted above, in the counting query, the facet values are not selected across all facets.

An embodiment uses a two-pass approach. The first pass discovers facet values that are to be counted, and the second pass counts discovered facet values and selects the facet values to transmit to a user or client. The first pass can be referred to as the facet values discovery pass and the second pass can be referred to as the facet value counting pass. In an embodiment, if facet counting is disabled, neither facet value discovery nor facet value counting passes are executed.

In an embodiment, the facet value discovery pass is skipped for fixed-value facets, that is, facets for which values are known a priory (facets with either supplied or configured values).

The discovery pass can be executed in parallel to scoring (that is, the relevance of documents to a user based, for example, on the user's profile). This approach requires two parallel queries - - - a first one to execute retrieval and scoring and a second one to execute retrieval and facet values discovery. After facet values are discovered in a search node, they can be forwarded to a broker, merged, and used during the counting pass. If the discovered facet values are not forwarded to a broker, the system may not know how to deal with facet counts, which are not returned from all nodes and some counts might be missed. This is only an issue however when early termination is in place. As noted above, when facet values are selected (for example, selecting "United States" in FIG. 1), this affects the discovery of values of other facets (that is, "Current Companies" in FIG. 1).

A facet query functionality is implemented in a manner similar to a disjunction query. The facet query is joined by a conjunction with a query condition in order to count only documents matched by a user query. Selected facet values should be taken into account when counting. As noted above, the selection should not affect counting of facet values within the same facet (e.g., location) while it should effect counting of values of other facets (e.g., current company).

The facet values counting pass counts facet values discovered in the previous (discovery) pass. Counting is done using an inverted index. Specifically, a query using the following parameters is used - - - query condition, list of facet values, and list of selected facet values. The query condition is a rewritten query without any early-terminating operators. The query condition can be deduced from the rewritten query by converting it using the following rules. If at least one clause of the query has a weight that is equal to 100%, then all clauses in the query with a weight equal to 100% are converted to an AND query, and the rest of the query clauses (that is, with weight <100%) are dropped. Otherwise, if at least one query clause has a weight that is greater than 0%, then all query clauses with a weight greater than 0% are converted to an OR query, and the rest of the query clauses (that is, with weight equal to 0%) are dropped. Otherwise, that is, all query clause weights are equal to 0%, and all query clauses are converted to an OR query.

For facet values with high cardinality (e.g., Google as a current company), an embodiment implements approximate counting. Approximate counting can be executed when a threshold number is reached. In a first approach to approximate counting, the first approach assumes that facet values are uniformly distributed across posting lists (which is most likely not true since members with a higher static rank tend to have more facet values). A posting list is a list of documents that all include a particular facet value. An approximate count is determined by multiplying a total number of documents in a particular posting list by a number of documents retrieved from the particular posting list that satisfy the search criteria at the time of the termination of the second search query (counting pass). This generates a result, and the result is divided by an ordered position in the particular posting list of a last retrieved document in the particular posting list that satisfies the search criteria.

In a second approach, which can be referred to as a statistical approximation, an offline analysis of facet data is run. In an example, ten percent of all members are selected and ordered by a static rank descending and grouped into buckets of size 300K (100 buckets out of 10% of 300M members). A graph can be used to assist in the statistical approximation. For example, an analysis could relate to a current company facet (past company, all experience facets, seniority facets, school facets correlate with current company facet) and group facet. The horizontal axis of the graph could relate to members in 300K buckets ordered by descending static rank. The vertical axis of the graph could relate to the number of members from a corresponding 300K bucket who work at the corresponding company. The vertical axis represents the number of members from a corresponding 300K bucket that joined a corresponding group. Exponential regression in the form y=a*e b*x is then used (y'=ln(y)=ln(a)+b*x=a'+b*x). Linear regression is used to estimate coefficients a' and b (hence a and b). Then, SA/SA+B=num matched so far/num matched total. S from a to b=integral from xa to xb (a*e b*x) dx=a/b*(e b*xb−e b*xa). In this manner, the a and b coefficients for each facet value can be estimated during offline analysis. In an embodiment, the a and b coefficients can be stored on a broker side of the system and passed to search nodes for the counting phase. In another embodiment, a polynomial regression is used or the data are split into several chunks and analyzed separately.

In an embodiment wherein there is an inverted index (for facet counting) with connections and groups present, a network facet handler supports counting of the following values. First degree connections in the social network can be counted by counting connections in a posting list for a searcher's social network member id. Second degree connections can be counted by counting a disjunction of posting lists for a searcher's first degree connections group. This can be done by counting a disjunction of posting lists for a searcher's groups as compared to everybody else.

FIGS. 2A, 2B, 2C, and 2D are a block diagram illustrating operations and features of a process and system for faceting search results. FIGS. 2A, 2B, 2C, and 2D include a number of process blocks 205-276. Though arranged substantially serially in the examples of FIGS. 2A, 2B, 2C, and 2D, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 2A, 2B, 2C, and 2D, at 205, a business networking system receives from a user a first search query that includes search criteria. For example, the user could supply "java engineer" or "java engineer mountain view" to locate all persons in the business networking system who have the terms "java engineer" or "java engineer mountain view" associated with their profiles. At 210, the business networking system executes the first search query. This first search query retrieves information relating to members of the business networking system based on the search criteria and retrieves additional information relating to one or more facet values of the business networking system based on the search criteria and a scoring of a relevance of the facet values to the user. Examples of these facet values are provided below. At 215, the business networking system executes a second search query using the one or more retrieved facet values to determine a count of documents that satisfy the search criteria and that include the one or more facet values. At 220, the business networking system selects a portion of the facet values for transmission to the user, and at 225, the business networking system displays on a user device the information relating to the members, the one or more facet values, and the counts for the one or more facet values.

At 230, the business networking system displays the facet values on the user device in an order based on the relevance of the facet values to the user. For example, the system can display the facet value of a particular company more prominently when the user has a prior connection to that company, or when the particular company employs many people from the same college or university that the user attended.

At 235, the business networking system generates one or more posting lists. Each posting list includes documents having a particular facet value. For example, a posting list may include all documents that include the term "java engineer." At 236, the business networking system terminates the second search query prior to completion of the second search query; and as noted at 237, estimates the count for each of the facet values. The estimation involves multiplying a total number of documents in a particular posting list by a number of documents retrieved from the particular posting list that satisfy the search criteria at the time of the termination of the second search query, thereby generating a result, and dividing the result by an ordered position in the particular posting list of a last retrieved document in the particular posting list that satisfies the search criteria. At 238, the count of the facet values is estimated by a statistical approximation. At 239, it is noted that the statistical approximation can include an exponential regression or a polynomial regression.

At 240, the business networking system executes a facet discovery request and a scoring of the facet values in parallel within the first search query. At 245, the scoring of the facet value is based on a profile of the user. For example, a scoring of a facet value relating to a particular company may be scored higher if many of the documents returned in the search include employees who attended the same university as reflected in the profile of the user.

At 250, and as explained above, the business networking system counts each of the facet values using an inverted index. At 254, the retrieval of the additional information relating to the one or more facet values of the business networking system involves a rewritten query. As explained above, when working with a rewritten query, if a weight of a least one search criterion in the query equals 100, then all search criteria in the query with weight equal to 100 are placed into a search query and coupled by an AND clause. If the weight of at least one search criterion in the query is greater than 0, then all search criteria with weight greater than 0 are placed into a search query and coupled with an OR clause. If all search criteria have weight greater than 0, then all search criteria are placed into a search query and coupled with an OR clause.

At 260, the scoring of the facet values by the business networking system is based on one or more of a browsing history of the user, a connection of the user, a following by the user, and a count of the search criteria in retrieved documents associated with the facet value.

At 270, the business networking system displays the facet values and the count of documents in a first category and a second category. The first category can be for example a geographical location, and the second category can be for example a particular company or business organization. At 272, the business networking system receives a selection in the first category. At 274, the business networking system maintains the one or more counts in the first category after the selection in the first category. At 276, the business networking system alters one or more counts in the second category based on the selection in the first category. For example, referring to FIG. 1, if a user selects a facet value of United States for the location, the facet values for the United States and the other countries will not be altered. However, the facet counts for the other facet values (that is, the current company facet values) will change such that only employees for the company in the United States will be considered.

Figure 3:
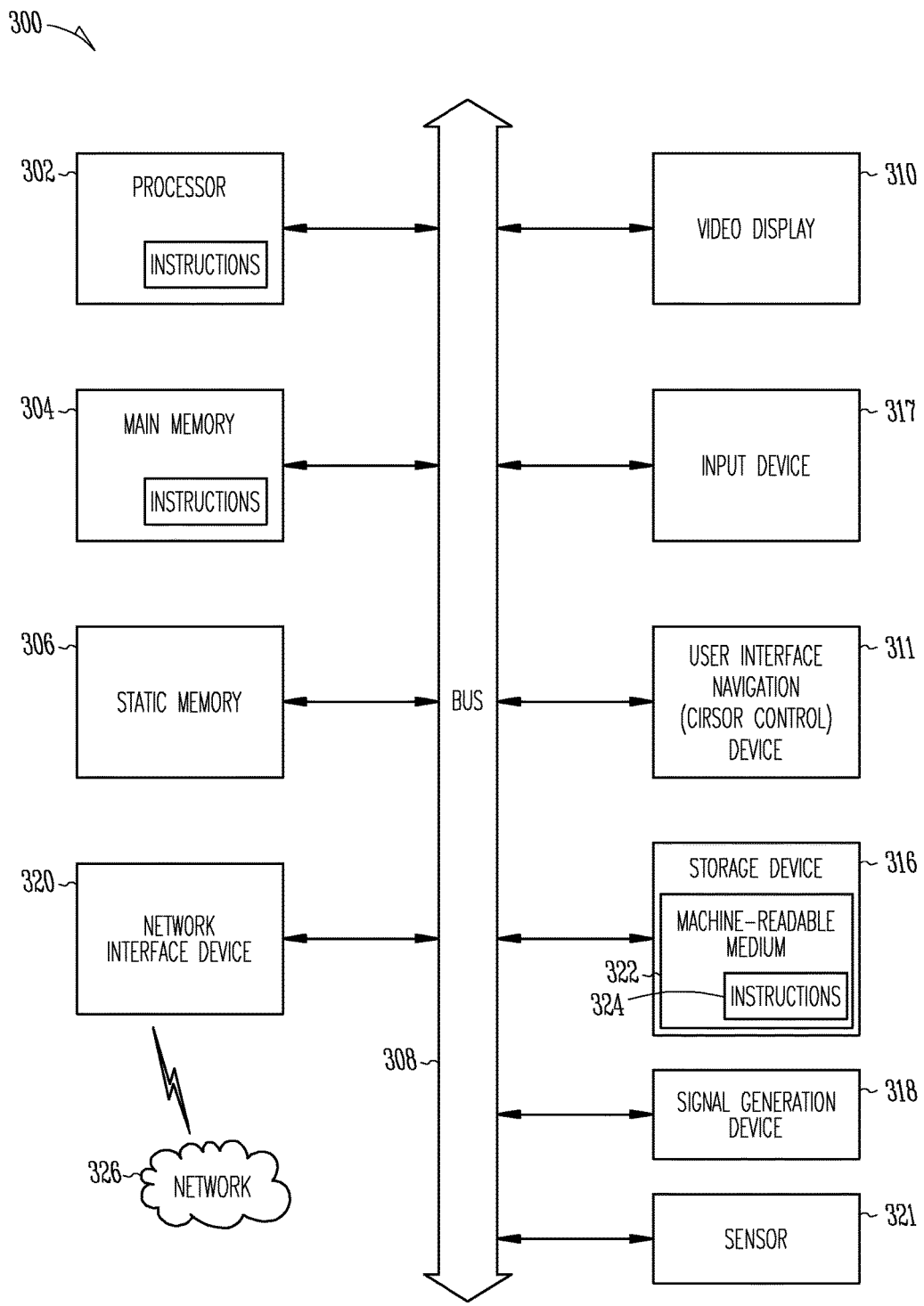
FIG. 3 is a block diagram illustrating components of a machine that is able to read instructions from a machine-readable medium (e.g., a machine-readable storage medium) and perform any one or more of the methodologies discussed herein.

FIG. 3 is a block diagram illustrating components of a machine 300, according to some example embodiments, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system and within which instructions 324 (e.g., software) for causing the machine 300 to perform any one or more of the methodologies discussed herein may be executed. In alternative examples, the machine 300 operates as a standalone device or may be connected (e.g., networked) to other machines. In a networked deployment, the machine 300 may operate in the capacity of a server machine or a client machine in a server-client network environment, or as a peer machine in a peer-to-peer (or distributed) network environment. The machine 300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. Further, while only a single machine is illustrated, the term "machine" shall also be taken to include a collection of machines that individually or jointly execute the instructions 324 to perform any one or more of the methodologies discussed herein.

The machine 300 includes a processor 302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 304, and a static memory 306, which are configured to communicate with each other via a bus 308. The machine 300 may further include a graphics display 310 (e.g., a plasma display panel (PDP), a light emitting diode (LED) display, a liquid crystal display (LCD), a projector, or a cathode ray tube (CRT)). The machine 300 may also include an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 may also reside, completely or at least partially, within the main memory 304, within the processor 302 (e.g., within the processor's cache memory), or both, during execution thereof by the machine 300. Accordingly, the main memory 304 and the processor 302 may be considered as machine-readable media. The instructions 324 may be transmitted or received over a network 326 via the network interface device 320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 322 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 300), such that the instructions, when executed by one or more processors of the machine (e.g., processor 302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A business networking system comprising:
   a computer processor configured to:
   receive from a user a first search query comprising search criteria;
   execute the first search query to retrieve information relating to members of the business networking system based on the search criteria and to retrieve additional information relating to one or more facet values of the business networking system based on the search criteria and a scoring of a relevance of the facet values to the user;
   execute a second search query using the one or more retrieved facet values to determine a count of documents that satisfy the search criteria and that include the one or more facet values;
   select a portion of the facet values for transmission to the user; and
   display on a user device the information relating to the members, the one or more facet values, and the counts for the one or more facet values;
   wherein the computer processor is configured to generate one or more posting lists, each posting list comprising documents having a particular facet value;
   wherein the computer processor is configured to terminate the second search query prior to completion of the second search query; and to estimate the count for each of the facet values; and
   wherein the count for each of the facet values is estimated, the estimation comprising multiplying a total number of documents in a particular posting list by a number of documents retrieved from the particular posting list that satisfy the search criteria at the time of the termination of the second search query, thereby generating a result, and dividing the result by an ordered position in the particular posting list of a last retrieved document in the particular posting list that satisfies the search criteria.

2. The business networking system of claim 1, wherein the computer processor is configured to display the facet values on the user device in an order based on the relevance.

3. The business networking system of claim 1, wherein the count is estimated by a statistical approximation.

4. The business networking system of claim 3, wherein the statistical approximation comprises an exponential regression or a polynomial regression.

5. The business networking system of claim 1, wherein the computer processor is configured to execute the retrieval of additional information relating to the one or more facet values of the business networking system based on the search criteria and the scoring of a relevance of the facet values to the user in parallel within the first search query.

6. The business networking system of claim 1, wherein the scoring of the facet value is based on a profile of the user.

7. The business networking system of claim 1, wherein the computer processor is configured to count each of the facet values using an inverted index.

8. The business networking system of claim 1, wherein the scoring of the facet values is based on one or more of a browsing history of the user, a connection of the user, a following by the user, and a count of the search criteria in retrieved documents associated with the facet value.

9. The business networking system of claim 1, wherein the computer processor is configured to:
   display the facet values and the count of documents in a first category and a second category;
   receive a selection in the first category;
   maintain the one or more counts in the first category after the selection in the first category; and
   alter one or more counts in the second category based on the selection in the first category.

10. The business networking system of claim 9, wherein the first category comprises geographical locations and the second category comprises identifications of business organizations.

11. A process comprising:
   receiving, into a computer processor, from a user a first search query comprising search criteria;
   executing in the computer processor the first search query to retrieve information relating to members of the business networking system based on the search criteria and to retrieve additional information relating to one or more facet values of the business networking system based on the search criteria and a scoring of a relevance of the facet values to the user;
   executing in the computer processor a second search query using the one or more retrieved facet values to determine a count of documents that satisfy the search criteria and that include the one or more facet values;
   selecting using the computer processor a portion of the facet values for transmission to the user;
   displaying on a user device the information relating to the members, the one or more facet values, and the counts for the one or more facet values;
   generating one or more posting lists, each posting list comprising documents having a particular facet value;
   terminating the second search query prior to completion of the second search query; and
   estimating the count for each of the facet values;
   wherein the estimating comprises multiplying a total number of documents in a particular posting list by a number of documents retrieved from the particular posting list that satisfy the search criteria at the time of the termination of the second search query, thereby generating a result, and dividing the result by an ordered position in the particular posting list of a last retrieved document in the particular posting list that satisfies the search criteria.

12. The process of claim 11, wherein the count is estimated by a statistical approximation; and wherein the statistical approximation comprises an exponential regression or a polynomial regression.

13. The process of claim 11, wherein the scoring of the facet value is based on a profile of the user; and wherein the scoring of the facet values is based on one or more of a browsing history of the user, a connection of the user, a following by the user, and a count of the search criteria in retrieved documents associated with the facet value.

14. The process of claim 11, comprising:
   displaying the facet values and the count of documents in a first category and a second category;
   receiving a selection in the first category;
   maintaining the one or more counts in the first category after the selection in the first category; and
   altering one or more counts in the second category based on the selection in the first category.

15. A non-transitory computer readable medium comprising instructions that when executed by a processor execute a process comprising:
   receiving from a user a first search query comprising search criteria;
   executing the first search query to retrieve information relating to members of the business networking system based on the search criteria and to retrieve additional information relating to one or more facet values of the business networking system based on the search criteria and a scoring of a relevance of the facet values to the user;
   executing a second search query using the one or more retrieved facet values to determine a count of documents that satisfy the search criteria and that include the one or more facet values;
   selecting a portion of the facet values for transmission to the user;
   displaying on a user device the information relating to the members, the one or more facet values, and the counts for the one or more facet values;
   generating one or more posting lists, each posting list comprising documents having a particular facet value;
   terminating the second search query prior to completion of the second search query; and
   estimating the count for each of the facet values;
   wherein the estimating comprises multiplying a total number of documents in a particular posting list by a number of documents retrieved from the particular posting list that satisfy the search criteria at the time of the termination of the second search query, thereby generating a result, and dividing the result by an ordered position in the particular posting list of a last retrieved document in the particular posting list that satisfies the search criteria.

* * * * *